(12) United States Patent
Cahill et al.

(10) Patent No.: US 10,365,381 B1
(45) Date of Patent: Jul. 30, 2019

(54) FLEXIBLE NUCLEAR LEVEL SENSING GAUGE

(71) Applicant: Vega Americas, Inc., Cincinnati, OH (US)

(72) Inventors: Bonaventure Cahill, Crestview Hills, KY (US); Thomas Niinemets, Cincinnati, OH (US)

(73) Assignee: Vega Americas, Inc., Cincinnati, OH (US)

( * ) Notice: Subject to any disclaimer, the term of this patent is extended or adjusted under 35 U.S.C. 154(b) by 0 days.

(21) Appl. No.: 15/004,516

(22) Filed: Jan. 22, 2016

(51) Int. Cl.
*G01T 1/20* (2006.01)

(52) U.S. Cl.
CPC ............ *G01T 1/2002* (2013.01); *G01T 1/201* (2013.01); *G01T 1/2018* (2013.01)

(58) Field of Classification Search
CPC ...... G01T 1/2018; G01T 1/2002; G01T 1/201
See application file for complete search history.

(56) References Cited

U.S. PATENT DOCUMENTS

| | | | |
|---|---|---|---|
| 3,384,288 A | 5/1968 | Miller | |
| 3,501,632 A * | 3/1970 | Wright | G01F 23/288 250/357.1 |
| 4,481,595 A | 11/1984 | Schiessl et al. | |
| 4,651,800 A | 3/1987 | Kollberg | |
| 4,735,253 A | 4/1988 | Vaterlaus | |
| 4,739,819 A | 4/1988 | Eriksson et al. | |
| 5,564,487 A | 10/1996 | Cahill et al. | |
| 5,629,515 A | 5/1997 | Maekawa | |
| 6,198,103 B1 * | 3/2001 | Houillion | G01F 23/288 250/357.1 |
| 6,551,231 B1 * | 4/2003 | Bliss | G01T 1/201 385/12 |
| 6,563,120 B1 * | 5/2003 | Baldwin | G01T 1/203 250/361 R |
| 9,158,007 B2 * | 10/2015 | Damm | G01F 23/288 |
| 2005/0189495 A1 * | 9/2005 | Ito | G01T 1/2002 250/368 |
| 2006/0138330 A1 * | 6/2006 | Baldwin | G01T 1/167 250/357.1 |
| 2012/0305782 A1 * | 12/2012 | Burr | G01T 1/1644 250/366 |

(Continued)

*Primary Examiner* — Christine S. Kim
(74) *Attorney, Agent, or Firm* — Wood Herron & Evans LLP

(57) ABSTRACT

A nuclear level sensing gauge for measuring the level of product in a bin. The gauge includes a source of nuclear radiation positioned adjacent the product in the bin and a housing. A primary scintillator is provided in the housing, adjacent the product in the bin, and opposite the source of nuclear radiation. Nuclear radiation from the source passes through the bin and impinges upon the primary scintillator, generating scintillating light. A light guide conveys the scintillating light from the primary scintillator to light sensing circuitry. The light guide is coupled to the primary scintillator through an air gap. The light guide produces scintillating light flashes in response to absorption of the scintillating light from the primary scintillator. The light sensing circuitry collects the light flashes from the light guide to provide a representation of the level of radiation-absorbing product in the bin.

26 Claims, 13 Drawing Sheets

(56) References Cited

U.S. PATENT DOCUMENTS

| | | | |
|---|---|---|---|
| 2012/0317791 A1* | 12/2012 | Frank | G01T 3/00 |
| | | | 29/592.1 |
| 2014/0264040 A1* | 9/2014 | Cahill | G01F 23/288 |
| | | | 250/362 |
| 2015/0014547 A1 | 1/2015 | Damm et al. | |

* cited by examiner

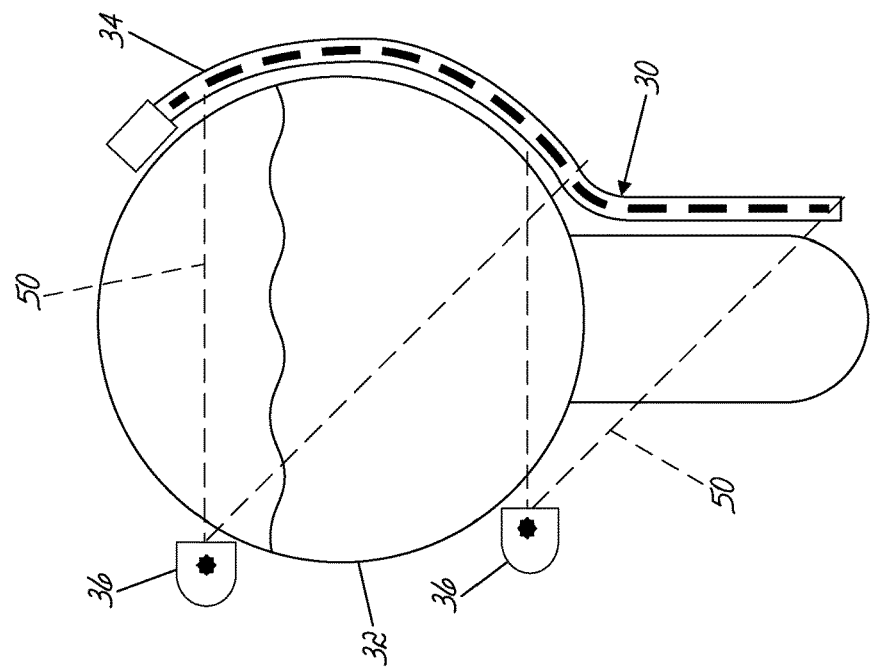
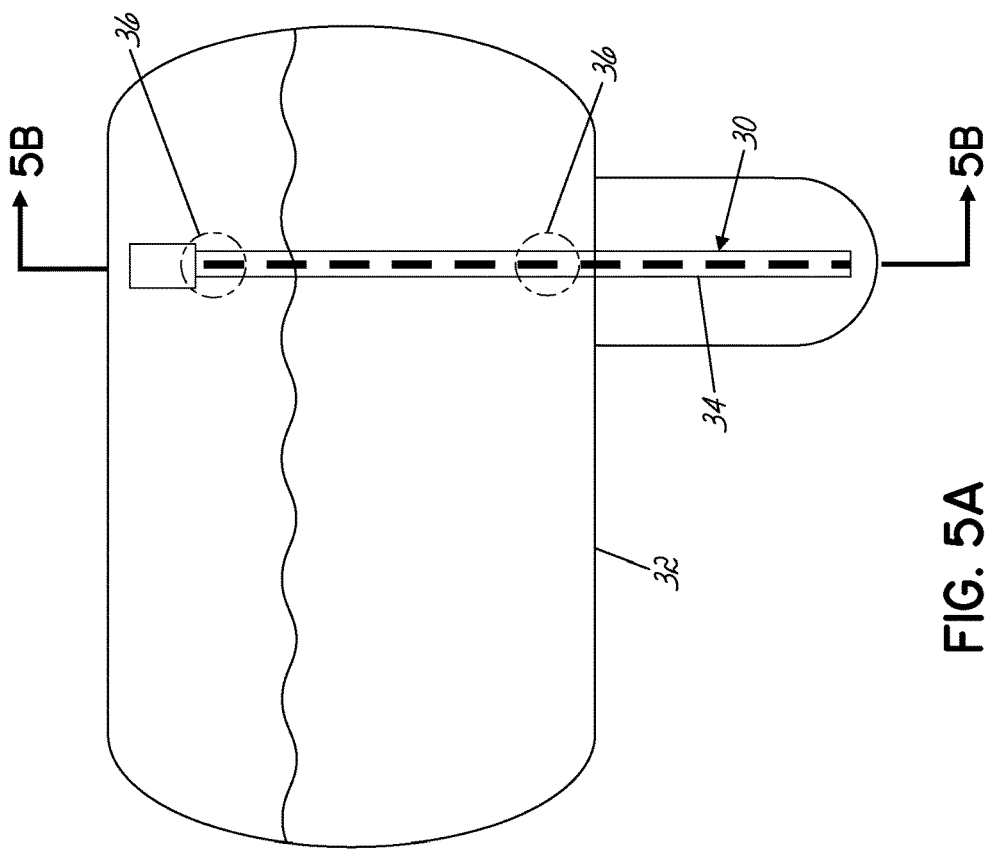
FIG. 5B
FIG. 5A

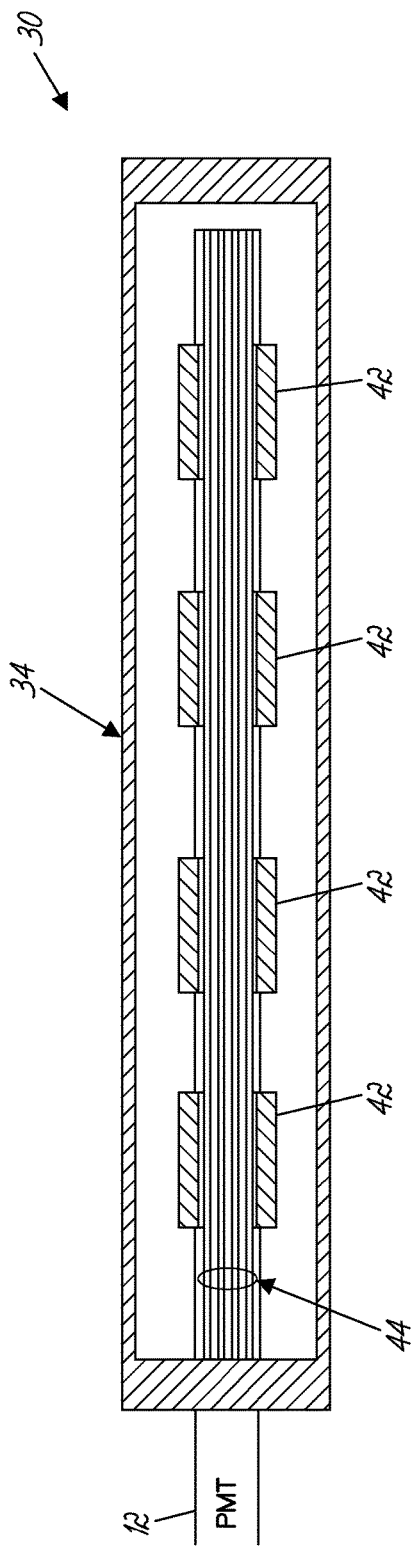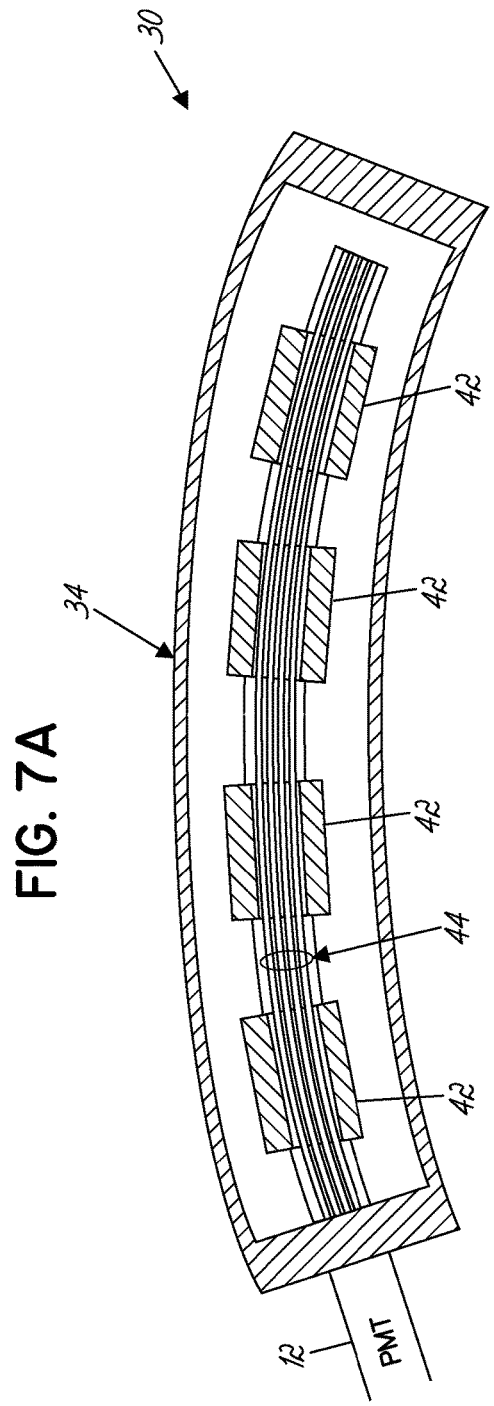
FIG. 7A
FIG. 7B

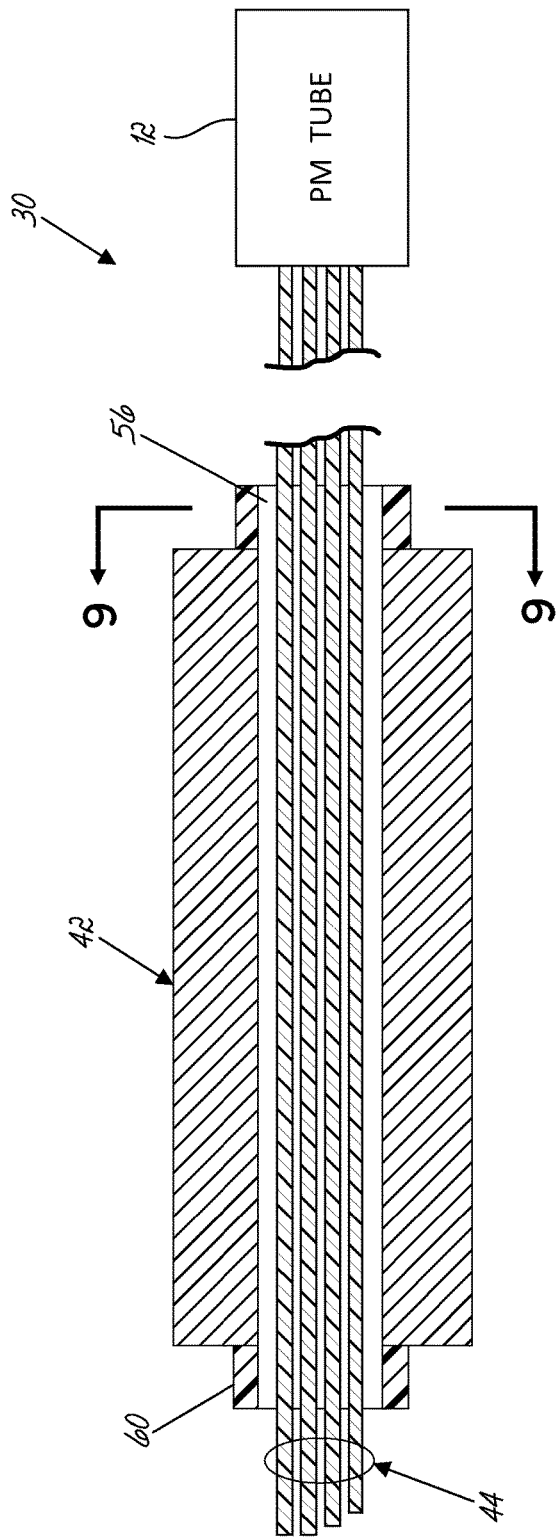
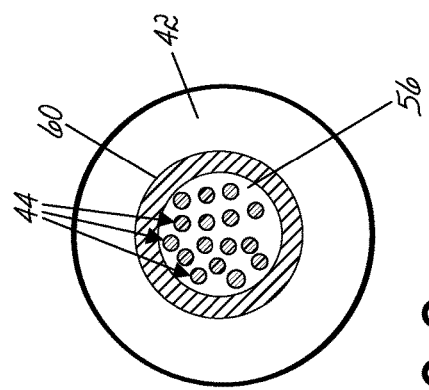
FIG. 8
FIG. 9

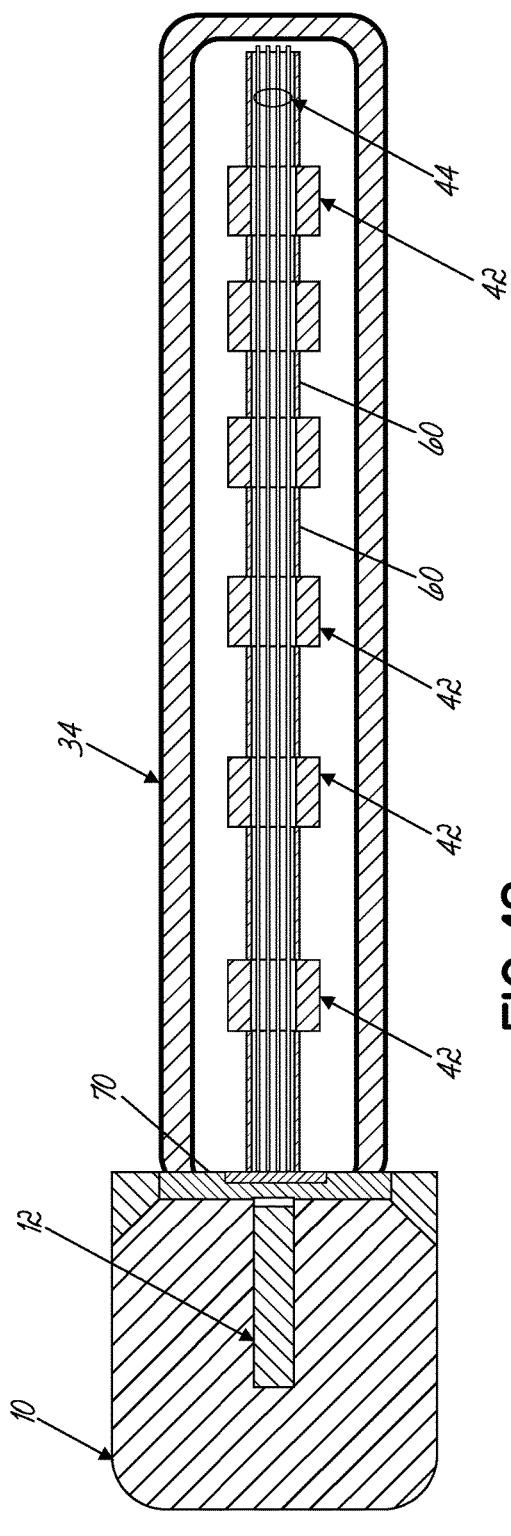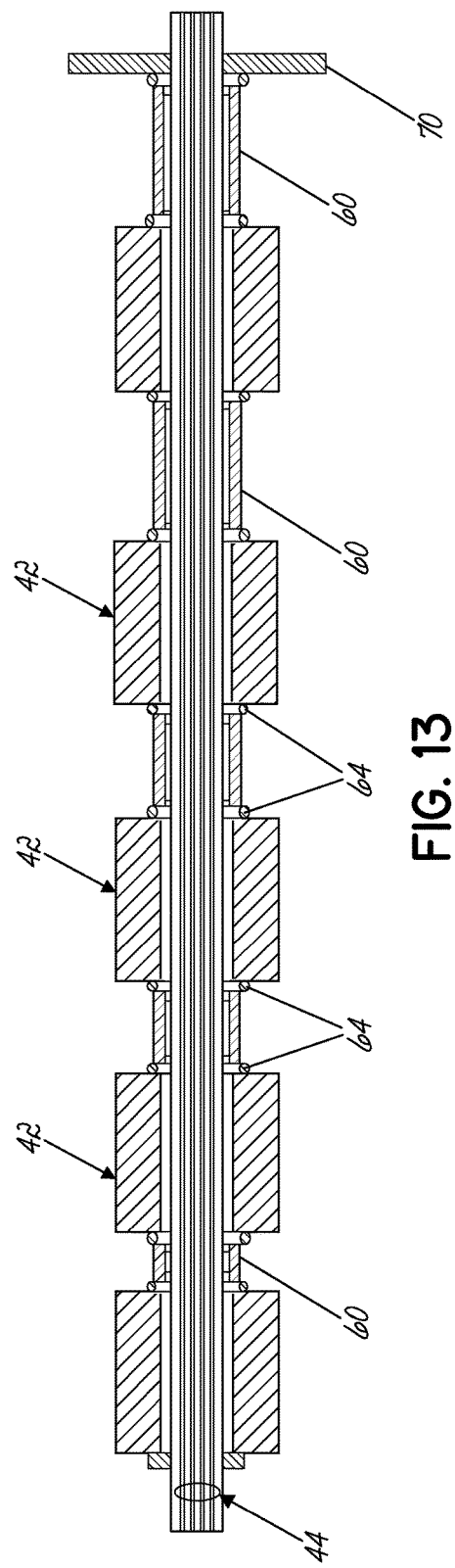
FIG. 12
FIG. 13

FLEXIBLE NUCLEAR LEVEL SENSING GAUGE

FIELD OF THE INVENTION

The present invention relates to radiant energy and, more particularly, to the use of radiant energy in a level sensing gauge.

BACKGROUND OF THE INVENTION

In many industrial environments, it is necessary to detect the level of product in a holding tank or bin. Level sensors are typically attached to the holding tank or bin, and electrically connected to remote gauges at a control room or other central location, where technicians or control systems may monitor the status of the bins to provide the appropriate process control. Various technologies have been developed for level sensing. These include various contact sensing technologies using floats or drop weights, as well as various non-contact technologies, such as reflecting electromagnetic radiation or ultrasonic vibrations from the surface of the product in the bin to determine the height of the product. In some applications, it is particularly important to move the sensor away from the product. For example, in a foundry where the level of a hot melt of steel or ore is to be level sensed, it is particularly important to keep the level sensor a safe distance from the hot melt. In these applications, nuclear level sensing gauges are used.

In a nuclear level sensing gauge, a source of nuclear radiation is positioned on one side of the bin to be level sensed. A nuclear radiation detector is placed on the opposite side of the bin. The radiation exiting the source is in the shape of a wide, generally vertically dispersed beam, directed toward the interior of the bin. The product in the bin substantially absorbs the radiation that impinges upon it. If, however, the bin is not full of product, some part of the beam of radiation from the source passes through the bin and irradiates the radiation detector on the opposite side of the bin from the radiation source. Because the product in the bin substantially absorbs the radiation that impinges upon it, thus reducing the amount of the radiation beam passing through the bin, the amount of radiation stimulating the radiation detector is inversely proportional to the amount of product in the bin. The radiation reaching the detector creates scintillating light flashes in the detector. The number of light flashes is proportional to the intensity of the incident radiation. A high sensitivity light sensor converts the light flashes into electrical pulses, which are amplified and evaluated by electronics to produce a measurement of the amount of product in the bin.

Traditionally, nuclear level sensing gauges have used an elongated scintillating crystal as a radiation detector. The scintillating crystal produces photons of light when exposed to nuclear radiation from a radiation source. The number of photons produced is related to the amount of radiation impinging on the crystal. A photomultiplier tube (PMT), used as a light sensor, is coupled to an end of the crystal. The PMT detects photons of light emanating from the scintillating crystal, and produces a signal indicative of the amount of radiation impinging on the crystal and, thus, the level of product in the bin. This type of sensor is discussed in U.S. Pat. Nos. 3,884,288, 4,481,595, 4,651,800, 4,735,253, 4,739,819 and 5,564,487.

Nuclear level sensing gauges have also been developed which utilize a bundle of one or more scintillating fibers as the radiation detector in place of a scintillating crystal. The scintillating fiber bundle may be directly coupled to a PMT, or coupled to a PMT via a light guide, which permits the PMT and amplifying electronics to be positioned remotely from the fiber bundle. The use of scintillating fibers yields substantial improvements in cost, performance, and ease of use; as well as size and sensitivity, as compared to gauges which use a scintillating crystal. Specifically, compared to a scintillating crystal, the scintillating fibers are lightweight, can be easily coiled for shipment, and are easily cut to the desired lengths. Scintillating fibers can be readily curved to match the curvature of a particular bin, whereas crystals are rigid and difficult to custom manufacture. Also, scintillating fibers have better internal reflection characteristics than crystals, meaning that fiber scintillating detectors can be made longer with less loss than crystal scintillating detectors. Finally, a bundle of one or more fibers can have substantially less heat capacity than the corresponding crystal, meaning the bundle is more readily cooled.

Unfortunately, both crystals and fibers exhibit light intensity losses when manufactured in long lengths. FIG. 1 illustrates the decay of light intensity as a function of the distance of travel from a scintillation source through a medium, and the definition of the "attenuation length" L (1/e) of a medium, which is defined as the distance that light can be transmitted through a medium before the light intensity is reduced to 1/e of its intensity at its origin. A fiber bundle typically has an attenuation length of about 2.5 meters. As can be seen from the FIG. 1 curve of light intensity vs. distance of travel, light loss is relatively severe at distances longer than the attenuation length, and nonlinear. However, fiber bundles and crystals have been used commercially at long lengths, up to 10 feet for crystals and 12 feet or longer for fiber bundles. Crystals are practically limited to approximately 10 foot lengths because of the difficulty of manufacturing bars in longer sizes. Fibers are not practically limited by manufacturing constraints, but are constrained by the attenuation length of the polystyrene medium used to make the fibers.

Engineers, confronting the limited lengths of scintillating crystals, have created serialized devices that use multiple crystals for level sensing. FIG. 2 shows a typical prior art arrangement of this kind, in which a plurality of scintillating crystals 14 are placed in a serial fashion adjacent a bin opposite to a radiation source S, each crystal stimulating a photomultiplier tube 12 which is coupled to electronic amplifiers 10. The output of the various amplifiers 10 is then coupled to summation electronics 20. Each crystal 14 has a length less than the attenuation length of the crystal medium, but the serially positioned crystals have a collective length Lt that can be substantially greater than the attenuation length. FIG. 3 shows an alternative, serialized arrangement of crystals 14 that has been used in installations where it is desired to move the photomultiplier tubes 12 remote from the crystals 14. In this arrangement, a light guide 18 couples light from each crystal 14 to each PMT 12. As in FIG. 2, the crystals are generally cut to a length less than the attenuation length of the crystal medium, but have a collective length Lt that can be substantially longer. While the arrangements illustrated in FIGS. 2 and 3 facilitate longer length applications, these gauges are highly complex and costly, due to the replication of the PMT 12 and electronics 10, and the requirement for a summation electronics unit 20.

In order to overcome the problems, cost, and complexity of prior nuclear level sensing gauges, Applicants, in U.S. patent application Ser. No. 13/798,179, disclose the use of a nuclear level sensing gauge having a plurality of scintillators, positioned in a serial fashion, adjacent the product in a bin. The scintillators are positioned on the opposite side of the bin from the nuclear source. As described therein, and shown in FIG. 4, the level sensing gauge uses a plurality of light guides 18 to couple light from the scintillators (either crystals 14 or fiber bundles 16) to a common light sensor or PMT 12, so that the common light sensor detects light generated in two or more scintillators. Accordingly, the number of photons generated in the scintillators is measured by a single light sensor, producing a measure of radiation-absorbing product in the bin, without the cost and complexity of multiple PMTs and amplifying electronics, as in the previous gauges.

While the use of a single, common light sensor greatly reduces the cost and complexity of the level sensing gauge, the rigidity of crystals 14 and light guides 18 in the gauge shown in FIG. 4 can limit the available placement of the gauge relative to bins or vessels having curved or complex shapes. Heretofore, gauges have typically been enclosed in a rigid housing, such as stainless steel, to provide protection from harsh operating conditions, and prevent movement or distortion in the optical couplings between the scintillator, light guide and light sensor. Additionally, in the prior gauges intimate contact has been required between the scintillator and light guide. This coupling contact has been required to facilitate collection of as many of the scintillation light flashes as possible, while reducing losses at the optical interfaces. Light guides have been cemented or otherwise securely affixed to the scintillators to optically couple the scintillators and light guides. However, tight, durable contact couplings can be difficult to assemble in the field, due to the harsh operating environment of many nuclear gauge applications. Additionally, the contact couplings in the light path may degrade over time due to movement or the harsh environment, adversely affecting operation of the gauge.

Measurement applications also may dictate a more flexible gauge in order to conform the gauge to the curvature of the bin or vessel being measured. For example, it can be desirable for the gauge to spiral down the exterior of a vessel in order to more accurately measure the contents of the vessel. While gauges have been developed with some degree of flexibility, this flexibility has been limited due to the need to maintain coupling contact between the scintillator and light guide. Prior gauges have attempted to couple the scintillator and light guide through an air gap, but the air gap can fill with water and freeze, causing refraction of the light and loss of output. Accordingly, to accommodate vessels of various shapes, while maintaining a high sensitivity profile, it is desirable to have a nuclear level sensing gauge with increased flexibility that can bend in three dimensions in order to conform the gauge to the shape of the product bin or vessel. Additionally, it is desirable to have a nuclear level sensing gauge that does not require coupling contact between the scintillator and light guide in order to transfer light from the scintillating detectors to the light sensor.

SUMMARY OF THE INVENTION

The nuclear level sensing gauges described herein improve upon prior gauges by combining the flexibility of scintillating fibers, with low-cost, plastic scintillating crystals, to provide a longer, flexible, linear, level detector that interfaces with a single, common light sensor and electronics. In the gauges described herein, flexible scintillating fibers are used as light guides for transferring gamma-radiation produced scintillations from primary scintillators, which may be scintillating crystals or fibers, to a common light sensor. The gauges described herein incorporate all the scintillating components into a housing that provides protection in harsh operating conditions, seals out ambient light, and allows the gauge to be manipulated and maintained in a flexed position.

In particular, in a first aspect a nuclear level sensing gauge is provided for measuring the level of product in a bin. The gauge includes a source of nuclear radiation positioned adjacent to the product in the bin. A primary scintillator is positioned in a housing adjacent the product in the bin and opposite the source of nuclear radiation. Nuclear radiation from the source passes through the bin and impinges upon the primary scintillator, causing the primary scintillator to generate scintillating light. The gauge further includes light sensing circuitry for detecting light and a light guide. Scintillating light is transmitted between the primary scintillator and the light guide through an air coupling. The light guide conveys the scintillating light from the primary scintillator to the light sensing circuitry. The light sensing circuitry detects and measures light from the light guide to provide a representation of the level of radiation-absorbing product in the bin.

In a second aspect, a nuclear level sensing gauge is provided for measuring the level of product in a bin. The gauge includes a source of nuclear radiation positioned adjacent the product in the bin. A plurality of scintillating crystals are spaced in a serial fashion in a housing adjacent the product in the bin and opposite the source of nuclear radiation. Each of the scintillating crystals having a conduit formed therein. The nuclear radiation from the source impinges on one or more of the crystals in an amount dependent upon the product in the bin, causing the crystals to generate scintillating light. The gauge further includes a common light sensor for detecting light and a plurality of scintillating fibers having a longitudinal length and a common end connected to the light sensor. The crystals are spaced along the length of the scintillating fibers, which emit light in response to absorption of scintillating light from the crystals. The emitted light is conveyed through the fibers to the common light sensor. The common light sensor detects the emitted light to provide a representation of the level of radiation-absorbing product in the bin.

In a third aspect, a method is provided for measuring the level of product in a bin. The method includes positioning a source of nuclear radiation adjacent to product in the bin and positioning a primary scintillator inside a housing. The housing being adjacent to the product in the bin, and opposite the source of nuclear radiation, such that nuclear radiation from the source impinges upon the primary scintillator, causing the primary scintillator to generate scintillating light. The method further includes providing a light guide extending through the housing, the light guide being coupled to the primary scintillator through an air gap for absorbing the scintillating light and emitting light in response thereto. The method further includes collecting emitted light from the light guide and using the collected light to provide a representation of the level of radiation-absorbing product in the bin.

The objects and advantages of the present invention shall be made further apparent from the accompanying drawings and the description thereof.

BRIEF DESCRIPTION OF THE DRAWINGS

The above advantages and features of the invention and embodiments thereof will be further apparent from the following drawings and detailed description, in which:

FIG. 5A is a schematic depiction of a storage vessel and a nuclear level sensing gauge for measuring product levels in the vessel;

FIG. 5B is a cross-sectional view of the storage vessel and nuclear level sensing gauge of FIG. 5A, taken along line 5B-5B;

FIG. 7A is a side sectional view of a first exemplary embodiment of a nuclear level sensing gauge;

FIG. 7B is a side sectional view of the nuclear level sensing gauge embodiment of FIG. 7A, showing the gauge in a flexed condition;

FIG. 8 is a more detailed, side sectional view of a primary scintillating crystal and wave guide fibers for the embodiment shown in FIG. 7A;

FIG. 9 is a cross-sectional view of a primary scintillating crystal and light guide fibers of FIG. 8, taken along line 9-9 of FIG. 8;

FIG. 12 is a side cross-sectional view of the first nuclear level sensing gauge embodiment, depicting variable spacing between the primary scintillating crystals;

FIG. 13 is a more detailed, side, cross-sectional view, similar to FIG. 12, depicting variable spacing between a plurality of primary scintillating crystals and tube spacers between the crystals;

DETAILED DESCRIPTION OF THE INVENTION

Figure 1:
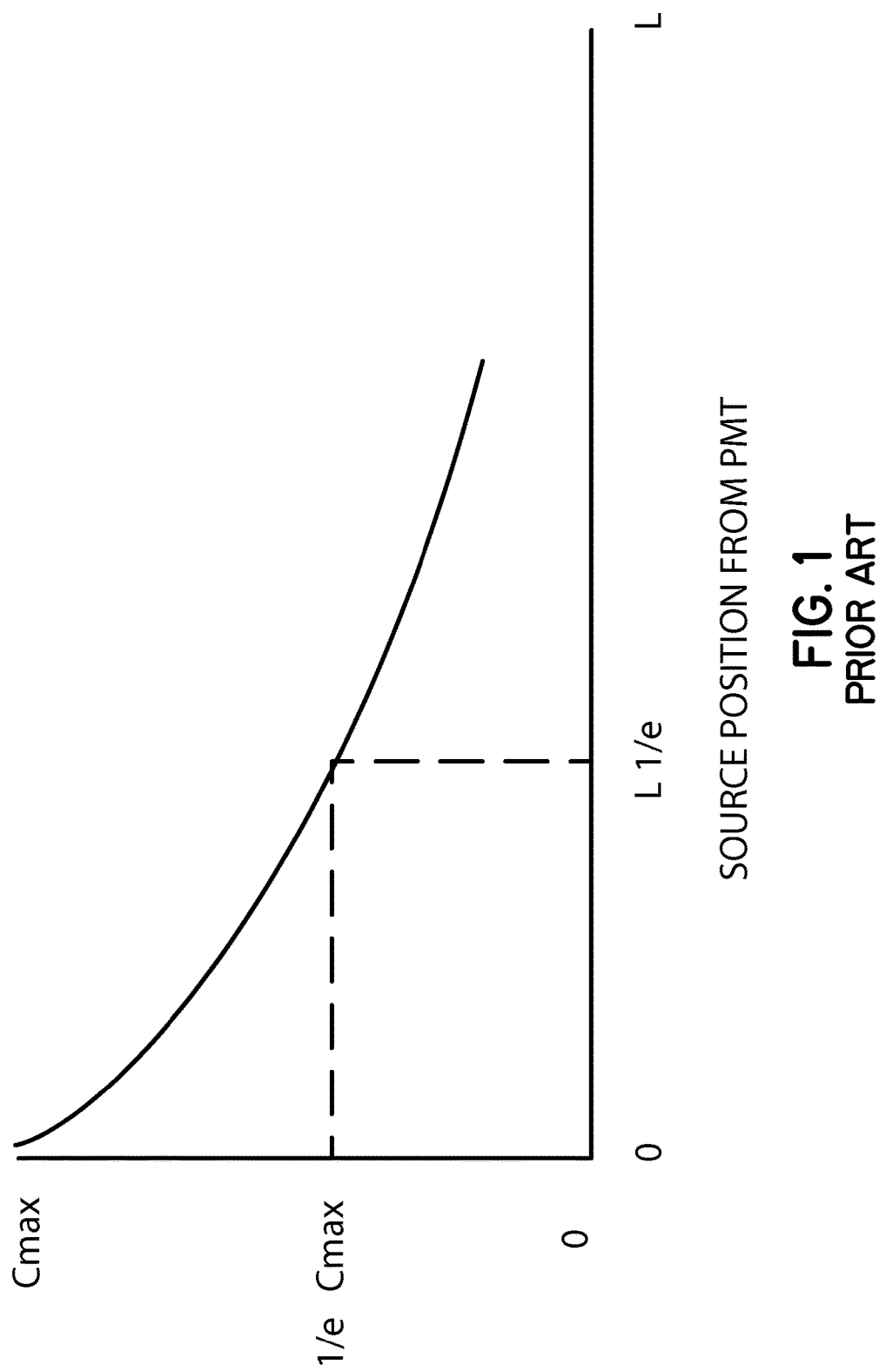
FIG. 1 illustrates the loss of light intensity through a medium as a function of distance from the light source, and the definition of the attenuation length L(1/e)
Figure 2:
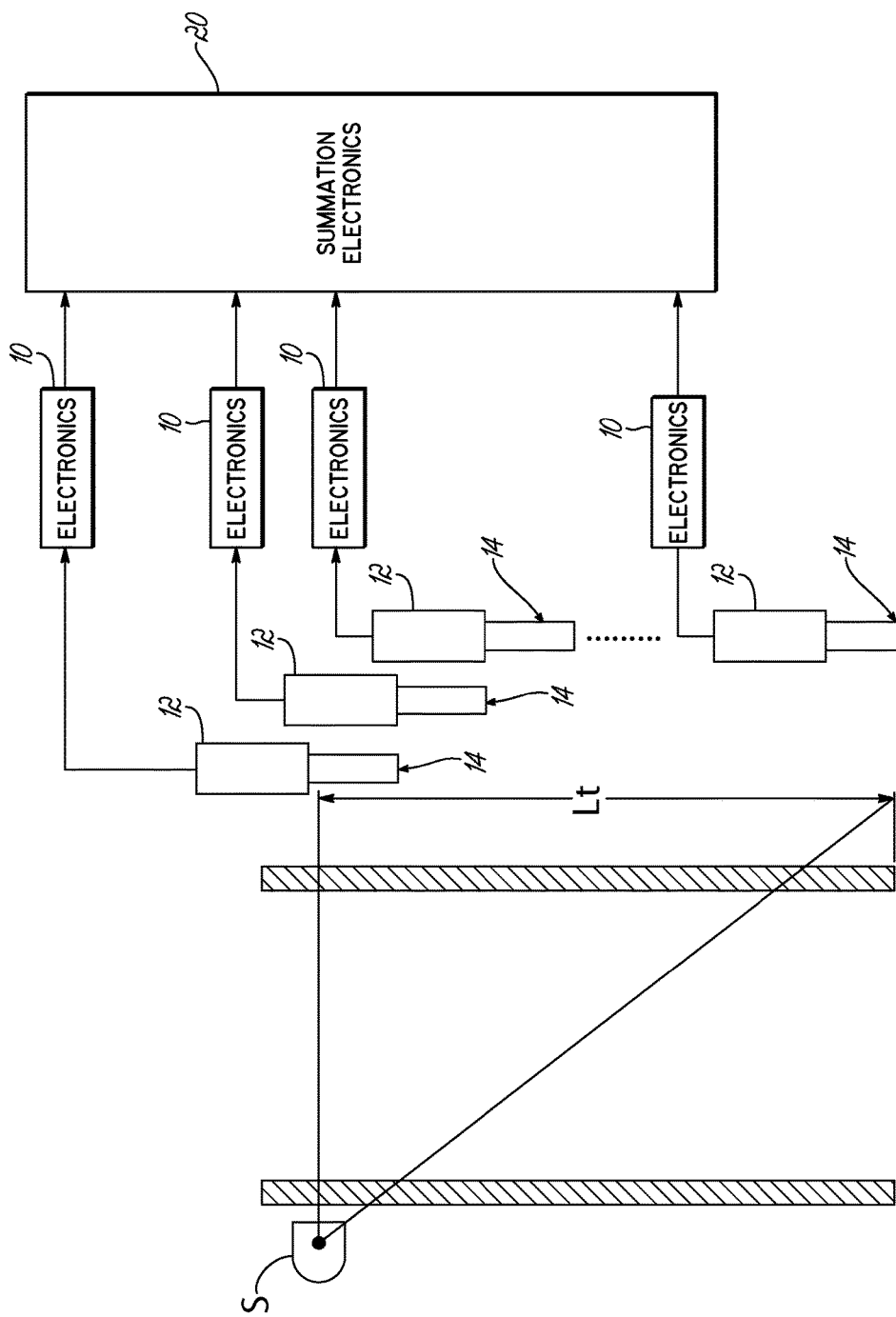
FIG. 2 illustrates a prior art nuclear level sensing gauge using a plurality of scintillating crystals arranged in a serialized fashion.
Figure 3:
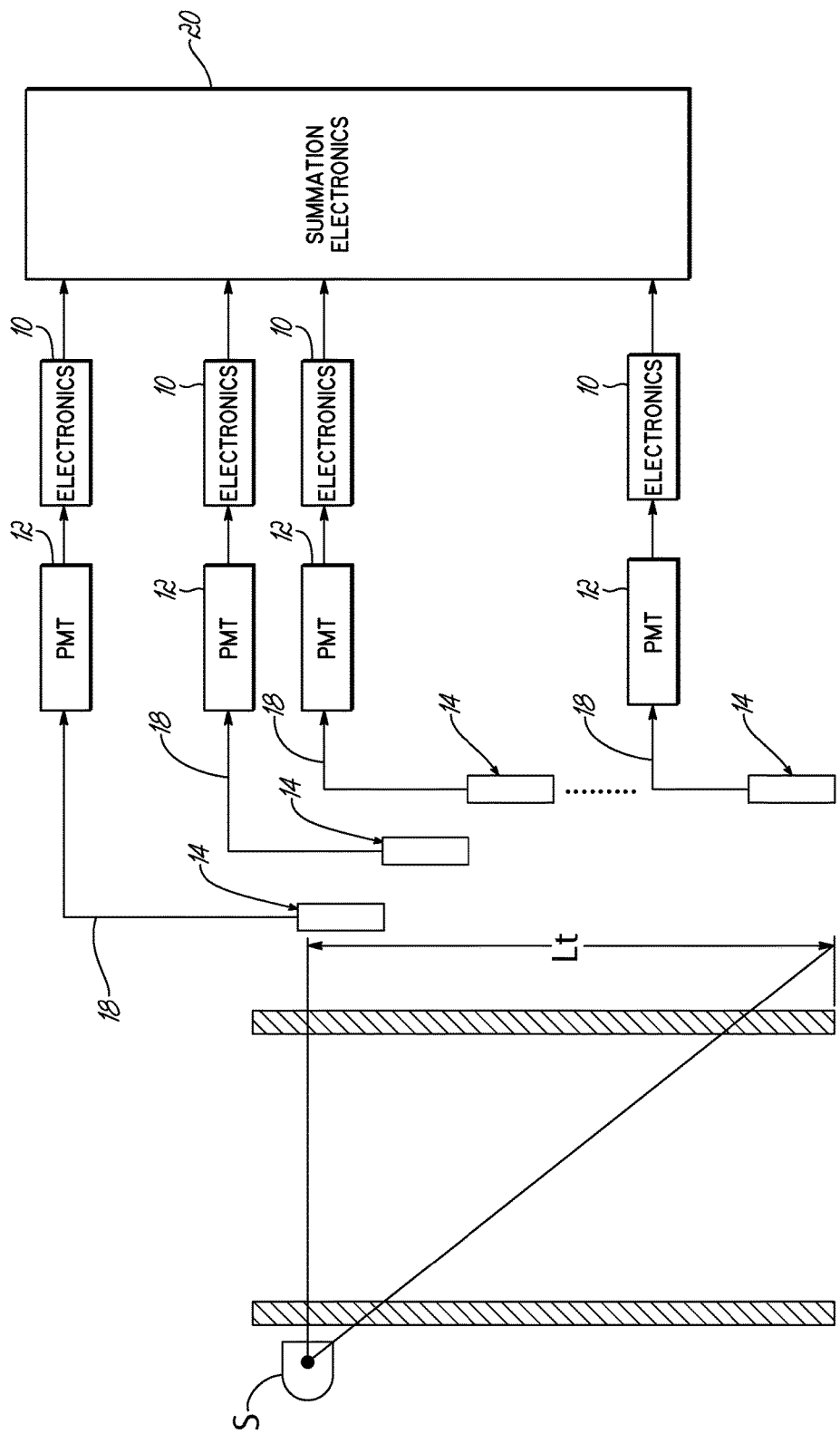
FIG. 3 illustrates a prior art nuclear level sensing gauge using a plurality of scintillating crystals arranged in a serialized fashion, and light guides to convey photons from the crystals to a plurality of remote photomultipler tubes and amplifying electronics.
Figure 4:
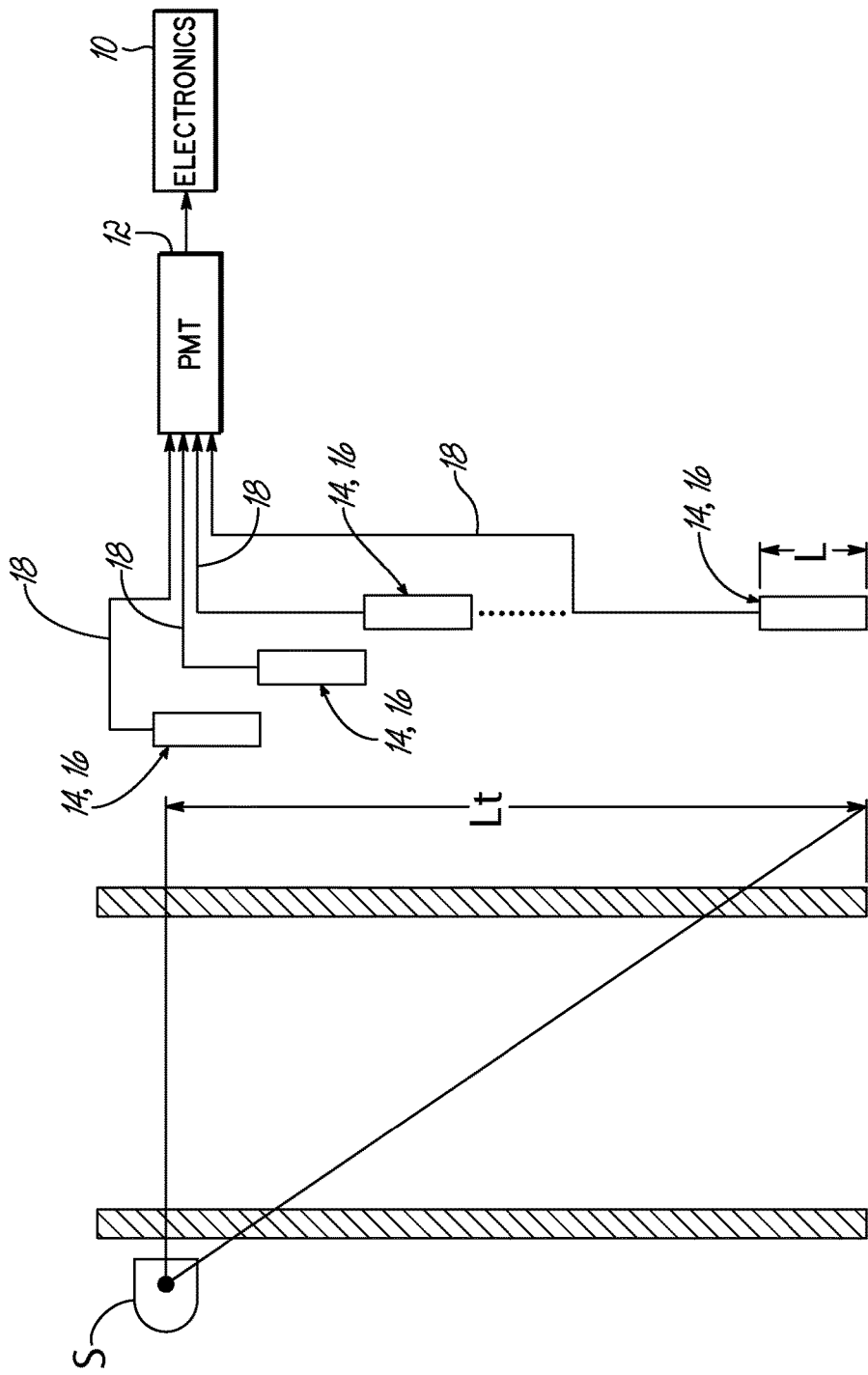
FIG. 4 illustrates a prior art nuclear level sensing gauge using a plurality of scintillators arranged with light guides coupling photons to a common photomultiplier tube and amplifying electronics.

Referring now to the drawing figures, in which like numbers indicate like elements throughout the views, FIGS. 5A and 5B illustrate a first embodiment for a nuclear level sensing gauge 30, shown attached to a vessel or bin 32, for measuring the level of product in the bin. Gauge 30 includes a housing 34 enclosing the scintillating components of the gauge. Housing 34 is an elongated tube formed of a flexible material that is sufficiently resilient to provide protection for the scintillating components from harsh operating conditions, while also being bendable in any direction relative to the longitudinal axis of the housing. Housing 34 also prevents ambient light from penetrating into the gauge 30. Examples of suitable materials for housing 34 include corrugated stainless steel tubing with a rubberized outer wall, and braided nylon for abrasion protection. Housing 34 is attached to the exterior of bin 32 on the opposite side of the bin from a radiation source 36. In the measurement application shown, two radiation sources 36 are utilized to accommodate a longer length gauge 30. However, any number of radiation sources may be utilized with the gauge 30, depending upon the vessel size, measurement range, sensitivity profile, and other requirements of the measurement application.

Figure 6:
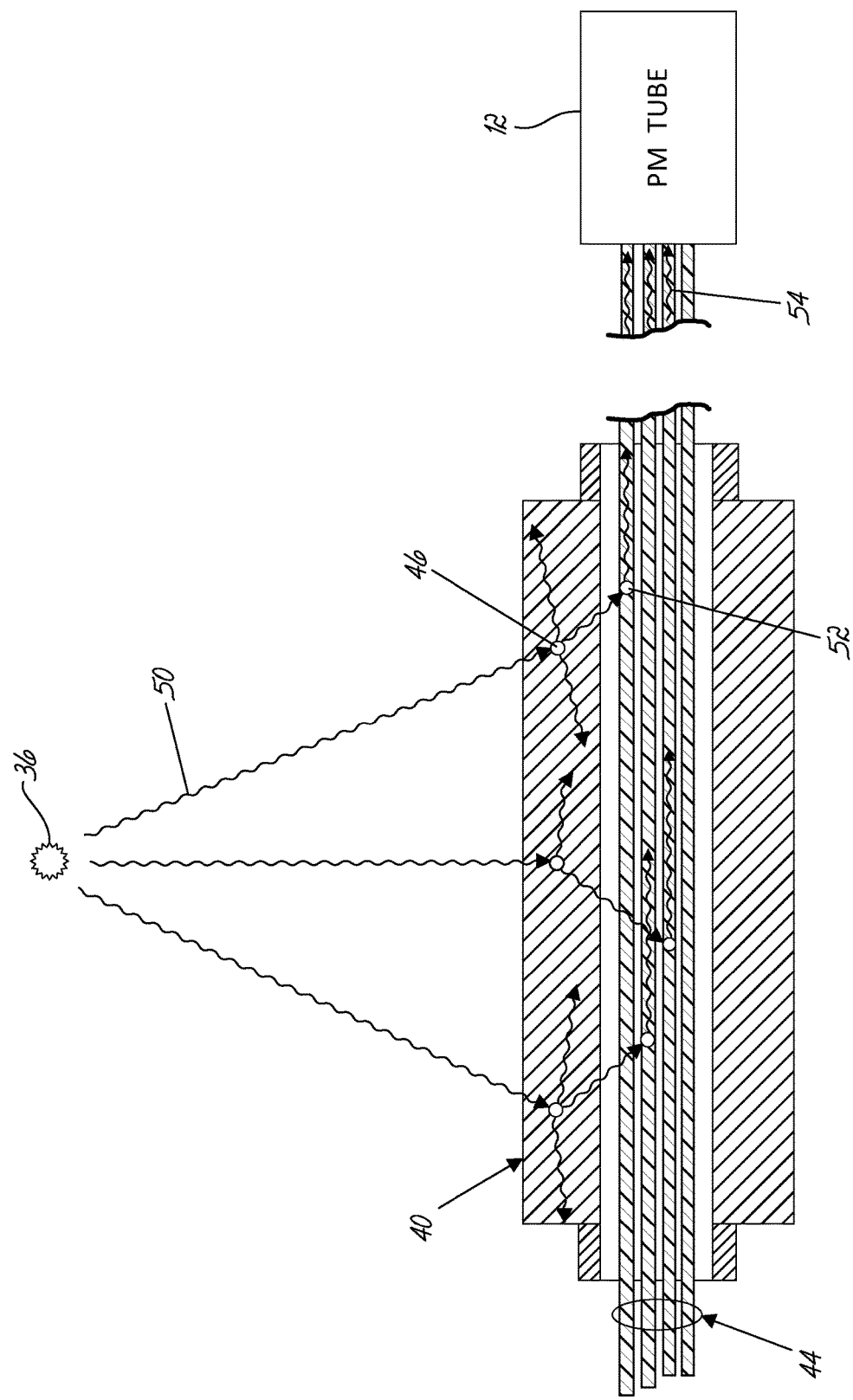
FIG. 6 is a diagrammatic, cross-sectional view of the radiation detection scheme of the nuclear level sensing gauges of the invention.

Referring now to FIG. 6, in each of the embodiments described below, light from a primary scintillator 40 is coupled to a common light sensor 12 using a light guide 44 composed of one or more scintillating fibers. In a typical application, the light guide 44 may comprise a bundle having approximately 50 scintillating fibers. The primary scintillator 40 generates scintillating light 46 in response to incident ionizing gamma radiation 50 from the radiation source 36. This scintillating light 46 is absorbed by the light guide scintillating fibers 44, which in turn produce scintillating light 52. Although not shown, the light guide fibers 44 may also create scintillating light from any gamma radiation particles 50 that impinge directly upon the light guide fibers. A portion of the light guide scintillating light will be trapped within the light guide fibers 44 and transmitted, as indicated at 54, to the light sensor 12 for collection, using the total internal reflection (TIR) characteristics of the light guide fibers. The light sensor 12 counts the number of light flashes created within the light guide fibers 44, and converts the number into an electrical pulse indicative of the number of light flashes and, thus, the level of product in the bin. As described herein, the common light sensor 12 may be any type of known light sensing circuitry and associated electronics, including a photomultiplier tube (PMT) or photodiode array.

In a first exemplary embodiment, shown in FIGS. 7A and 7B, nuclear level sensing gauge 30 includes a hybrid solid crystal/fiber bundle scintillator assembly, in which the primary scintillator, in the form of a plurality of scintillating crystals 42, is combined with a light guide 44, composed of one or more scintillating fibers. The hybrid solid crystal/fiber bundle scintillator assembly provides for greater flexibility in the gauge with a single, common light sensor 12, while alleviating the attenuation problems associated with previous scintillating fiber bundle gauges. In one exemplary application, the primary scintillating crystals 42 are plastic scintillators composed of polyvinyl toluene, which produces UV light ($\lambda = \tilde{}380$ nm) in response to absorption of gamma radiation from radiation source 36. In this exemplary application, the light guide fibers 44 are composed of polystyrene, which produces blue light ($\lambda = \tilde{}450$ nm) in response to absorption of either gamma radiation from source 36, or scintillating UV light from the primary scintillators 42. In alternative embodiments, the primary scintillators 42 may by composed of polystyrene to release blue photons, which will be absorbed and waveshifted to green photons by the scintillating light guide fibers prior to detection by light sensor 12.

As shown in FIGS. 7A and 7B, in this first embodiment the primary scintillator is composed of a plurality of individual scintillating crystals 42 in a spaced relationship along the longitudinal length of housing 34. As shown in greater detail in FIGS. 8 and 9, each of the scintillating crystals 42 includes an opening 56 through which the light guide fibers 44 extend. Each opening 56 has a diameter that is greater than the combined diameters of the light guide fibers 44, thereby forming an air gap between the inner diameter of the crystal and the light guide fibers. This air gap allows the light guide fibers 44 to move freely within the opening 56 with random fiber to fiber spacing, as illustrated in FIG. 9.

Figure 10:
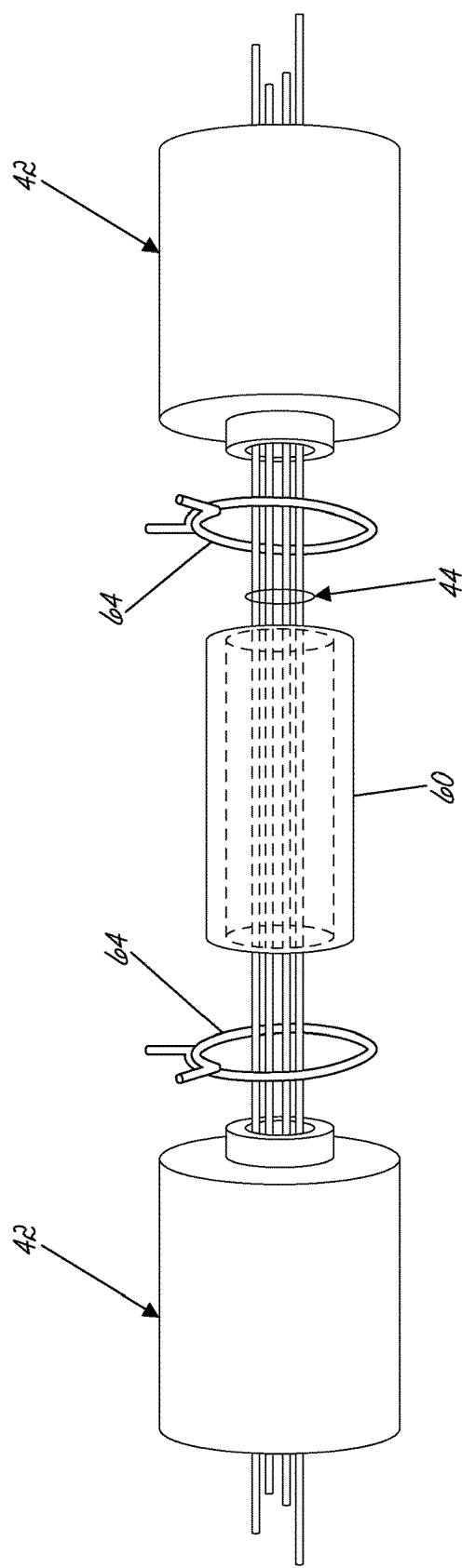
FIG. 10 is a more detailed, side view of a pair of primary scintillating crystals and connectors, shown in a disassembled position.
Figure 11:
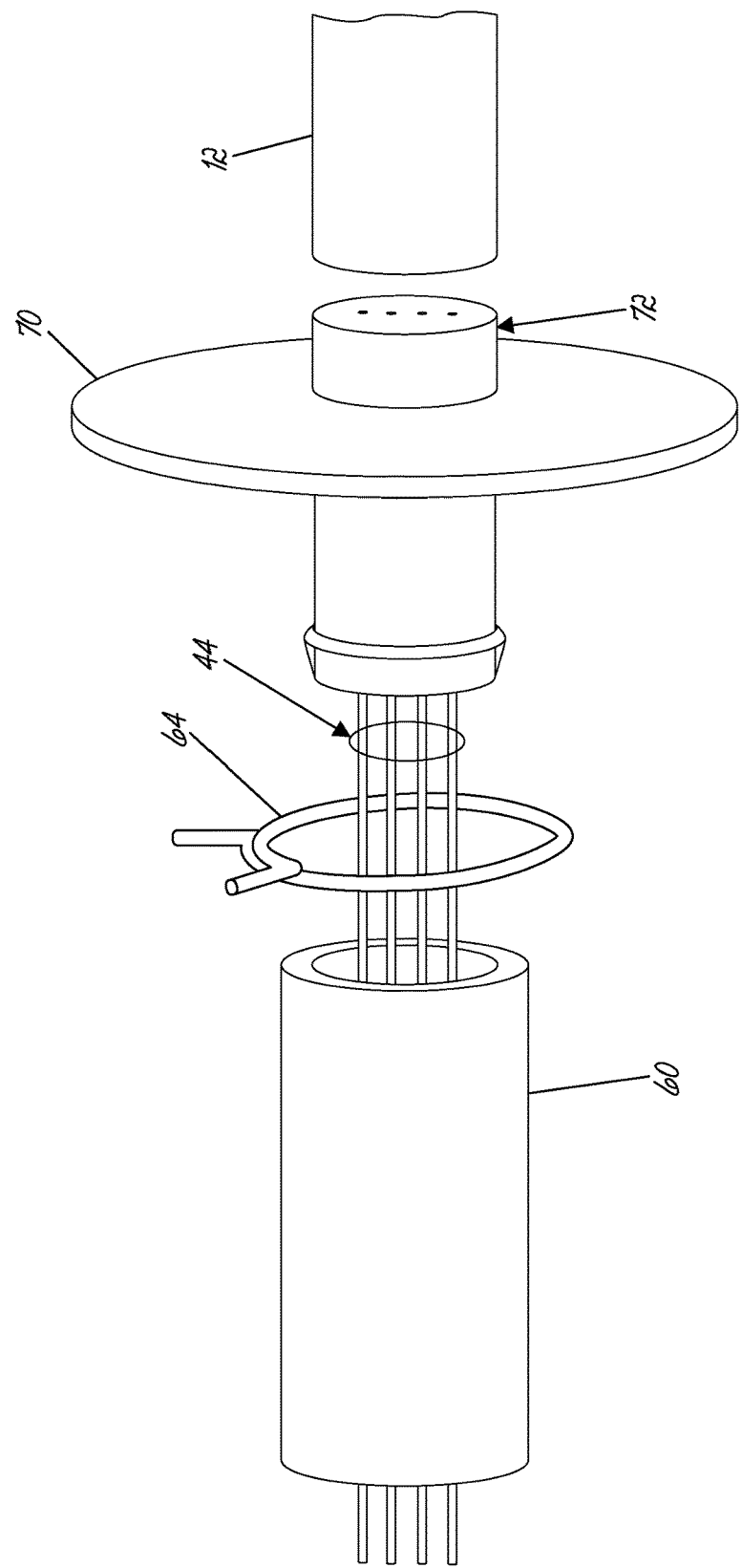
FIG. 11 is a more detailed, side view of a mounting flange at the proximal end of the housing, shown in an exploded, disassembled position.

As shown in FIGS. 8-11, in this embodiment gauge 30 also includes a plurality of flexible tubes 60 extending between and connecting the primary scintillating crystals 42. Tubes 60 are located between each of the scintillating crystals 42 to maintain the spacing between the crystals. Tubes 60 may be made of spring-reinforced PVC tubing, or another similar flexible material, to allow the tubes to flex within housing 34. Light guide fibers 44 pass through tubes 60 and scintillating crystals 42 within housing 34. Tubes 60 have an inner diameter that is coaxial with openings 56 in scintillating crystals 42 to continue the air gap surrounding the light guide fibers 44 from the crystals through the tubes. Primary scintillating crystals 42 are coupled to light guide fibers 44 through the air gap, with scintillating light flashes 46 passing through the air gap to impinge on the light guide fibers. As shown in FIG. 10, tubes 60 are attached at each end to the adjacent scintillating crystals 42 using spring clamps 64. Flexible tubes 60 allow the series of scintillating crystals 42 to flex multi-directionally with the bending of housing 34. As shown in FIG. 11, a first one of the tubes 60 is attached to a mounting flange 70 by a spring clamp 64. Mounting flange 70 connects the proximal end of the scintillator assembly to gauge housing 34. Light guide fibers 44 extend through mounting flange 70. A ferrule 72 couples the proximal, common ends of the light guide fibers 44 to the light sensor 12. As shown in FIG. 12, the distal-most tube 60, at the opposite end of the spaced crystals 42 from mounting flange 70, remains unattached adjacent the closed end of housing 34. Retaining the distal end of the scintillating assembly unattached within the housing 34 allows the series of scintillating crystals 42 and tubes 60 to flex with the bending of the housing.

As shown in FIGS. 12 and 13, the spacing between scintillating crystals 42 can be varied within housing 34 to adjust the sensitivity profile of the gauge 30 and, thus, optimize the linear performance. The individual lengths of tubes 60 between the crystals 42 can be varied to obtain the desired spacing between crystals. In particular, the spacing between crystals 42 can be decreased by decreasing the lengths of tubes 60 in a direction away from the light sensor 12, in order to increase the density of scintillating medium present at increased distance from the light sensor. The closer spacing of crystals 42 at the distal end of the gauge 30 compensates for the attenuation that occurs as photons travel greater distances through the light guide fibers 44. The selection of the number of scintillating crystals in the scintillator assembly, and the spacing between individual crystals, can be customized based upon the vessel geometry and measurement range of the application.

In addition to varying the spacing between crystals, the length or mass of the individual crystals 42 may be increased, as the distance from the light sensor 12 increases. The mass of the crystals 42 can be varied by expanding the longitudinal length of the individual crystals in order to increase the overall density of the scintillating crystal medium. The increased size of the crystals enables more scintillating light to be absorbed and transmitted to light guide fibers 44 at the greater distances from the light sensor 12, thereby increasing the volume of photons that are transmitted from the distal ends of the light guide fibers to the light sensor. While the exemplary gauge embodiments are illustrated in the drawing figures with between four and six scintillating crystals, it should be understood that any number of scintillating crystals may be used in the gauge embodiments described herein without departing from the scope of the invention. The number of scintillating crystals used, the length of the individual scintillating crystals, and the spacing between scintillating crystals may vary, with the particular selections depending upon the desired sensitivity profile of the gauge, and the overall measurement range desired for the particular bin or vessel.

Figure 14A:
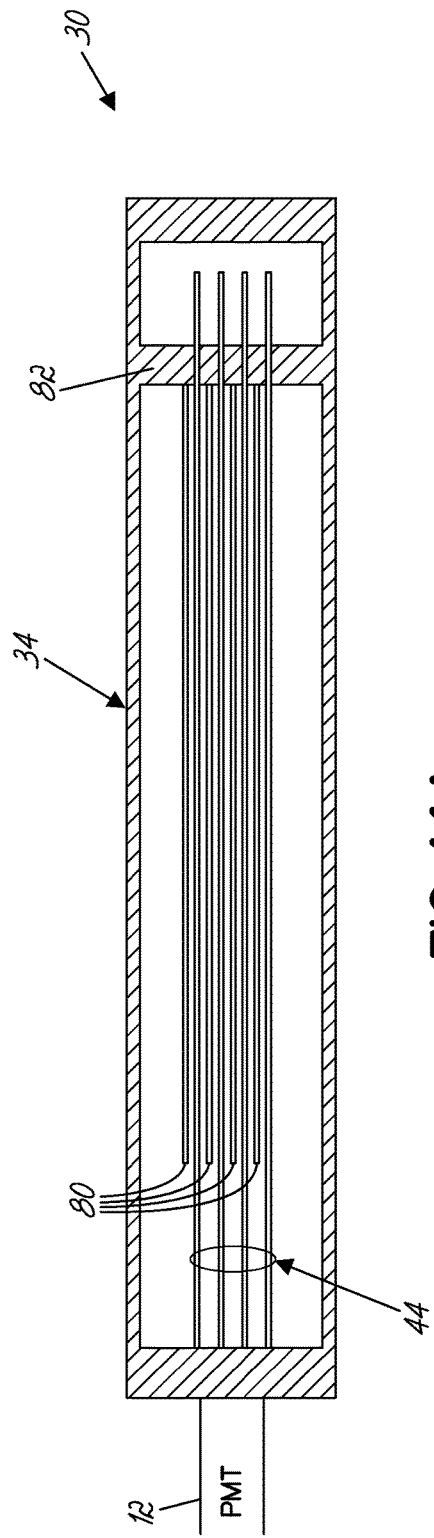
FIG. 14A is a side cross-sectional view of a second exemplary embodiment of a nuclear level sensing gauge.
Figure 14B:
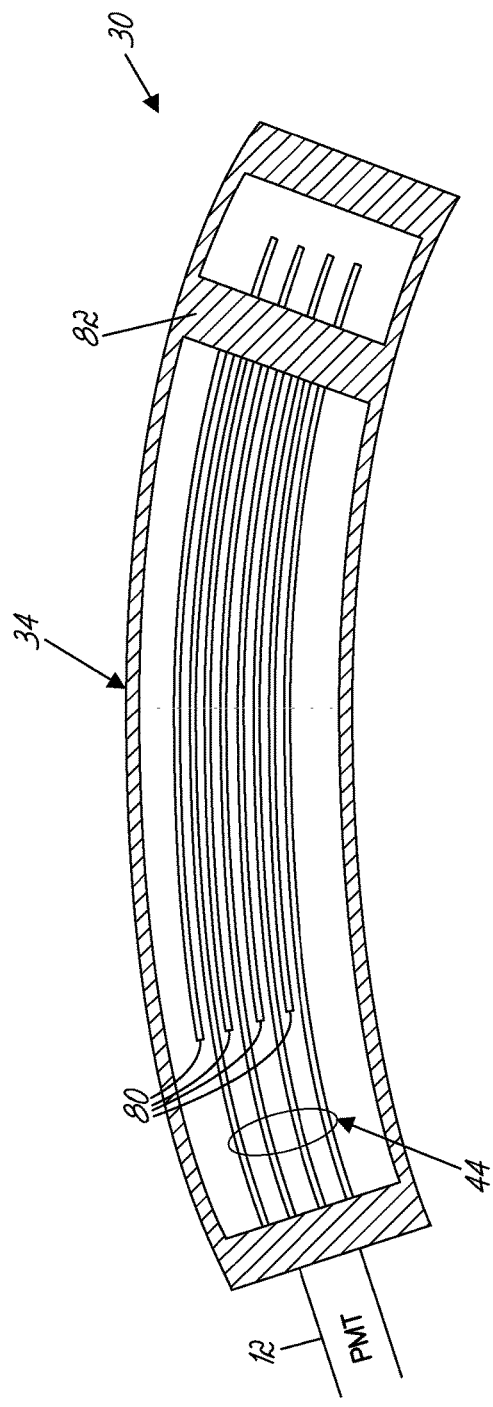
FIG. 14B is a side cross-sectional view of the nuclear level sensing gauge of FIG. 14A, showing the gauge in a flexed condition.

FIGS. 14A and 14B illustrate a second exemplary embodiment for gauge 30. In this second embodiment, the primary scintillator is composed of a bundle of scintillating fibers 80. The primary scintillating fibers 80 may be interlaced between the light guide fibers 44 as shown, or otherwise positioned to extend amongst the light guide fibers through the opening or air gap within housing 34. The primary scintillating fibers 80 and the light guide fibers 44 are mounted within housing 34 so as to allow the fibers to flex and bend in multiple directions with the flexing of the housing, as shown in FIG. 14B. In particular, the primary scintillating fibers 80 have a common end that is attached to a housing end plug 82 near the distal end of housing 34, while the opposite end of the primary fibers remains unattached. The light guide fibers 44 have a common end that is attached to the mounting flange 70 at the opposite end of housing 34 from plug 82, for coupling light from the fibers into light sensor 12. The opposite, distal ends of the light guide fibers 44 remain unattached at the closed end of housing 34. The primary scintillating fibers 80 and the light guide fibers 44 extend between each other through housing 34. In this embodiment, the primary scintillating fibers 80 and light guide fibers 44 may come in contact with the flexing and movement of housing 34, but contact between the fibers is not necessary for coupling light between the fibers, and transmitting the light to the light sensor. Scintillating light 46 is coupled between the primary scintillating fibers 80 and light guide fibers 44 through the air space surrounding the fibers.

Figure 15:
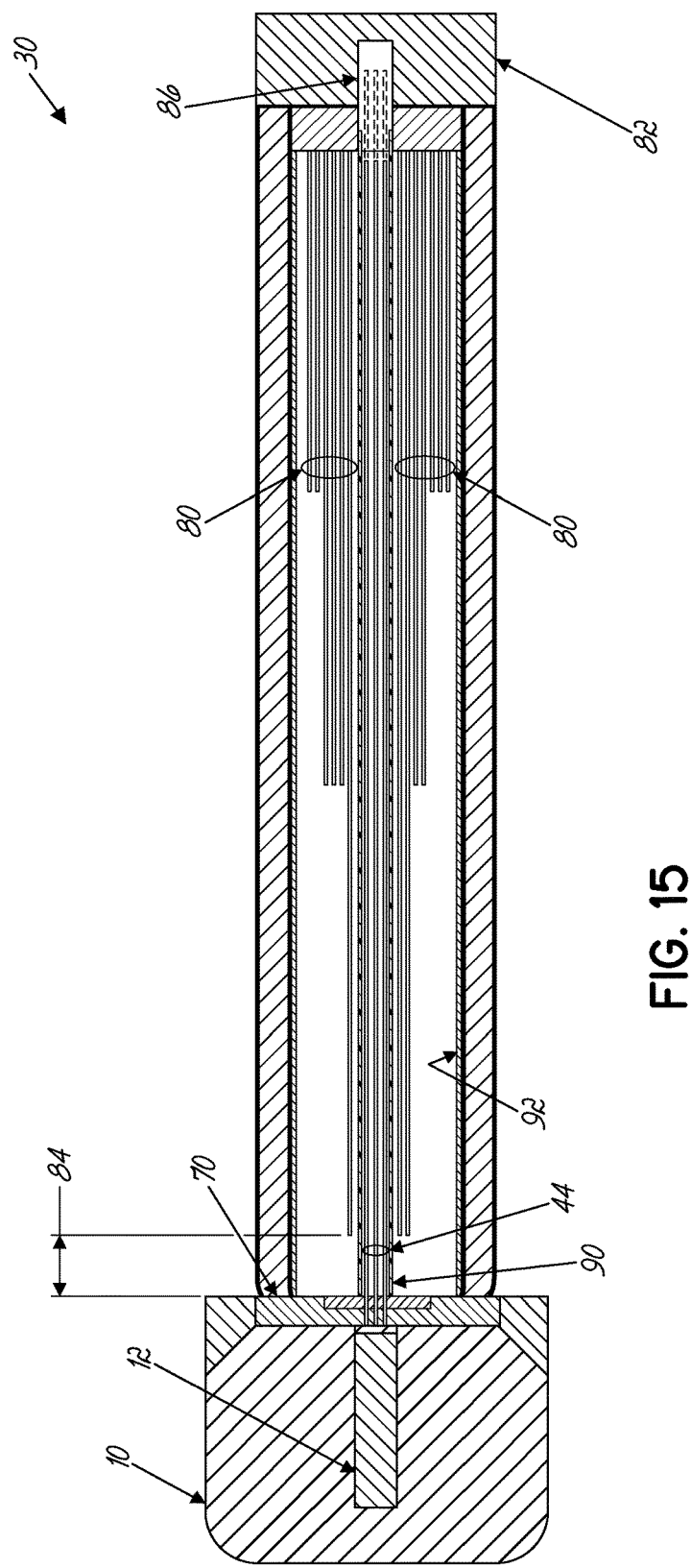
FIG. 15 is a side cross-sectional view of a third exemplary embodiment of a nuclear level sensing gauge, depicting variable thickness in a primary scintillating fiber bundle.

FIG. 15 depicts a third embodiment for gauge 30 in which the primary scintillator is a bundle of scintillating fibers 80. In this embodiment, the lengths of the primary scintillating fibers 80 in the bundle are varied in order to vary the density of the scintillating medium at different distances within the gauge 30. In particular, gauge 30 includes fiber bundles having varying thicknesses, i.e. number of fibers of a particular length. The thickness of the primary scintillating fiber bundle 80 is increased in the direction away from the light sensor 12, in order to compensate for the attenuation that occurs within the light guide fibers 44 at greater distances within the gauge. Increasing the density of the scintillating medium in the direction away from the light sensor 12 optimizes the linear response of the gauge by increasing the potential number of scintillating photons released for the same quantity of incident radiation 50 upon the fibers. The increased number of photons released per quantity of incident radiation increases the intensity of scintillating light traveling in the light guide fibers 44, enabling a minimum threshold of light to reach the light sensor 12 with sufficient intensity to be detected. Producing more scintillating light flashes at increased distances from the light sensor 12 improves the linear performance of the gauge 30, as it serves to equalize the number of photons capable of being produced along the length of the gauge from the incident beam of radiation 50. In the exemplary embodiment shown in FIG. 15, three different thicknesses are shown for the primary scintillating fiber bundle 80. However, greater or lesser thicknesses of fiber bundles may be utilized within the gauge 30 to optimize the performance of the gauge.

As shown in FIG. 15, expansion room is provided at the unattached ends of both the primary scintillating fibers 80 and the light guide fibers 44, as indicated at 84 for the primary scintillator fibers 80, and at 86 for the light guide fibers 44. The expansion room 84, 86 allows both sets of scintillating fibers to bend and flex within the housing. The primary scintillating fibers 80 and the light guide fibers 44 are maintained in a non-contacting relationship inside of housing 34, with scintillating light 46 being coupled between the primary scintillating fibers 80 and the light guide fibers 44 through the air space surrounding the fibers.

Light guide fibers 44 extend through a guide tube 90 which is centered within the primary scintillating fibers 80, to maintain the light guide fibers in a centralized position relative to the primary scintillating fibers, and maximize the exposure of the light guide fibers to the scintillating light 46. A sleeve 92 can be incorporated into housing 34 to surround the exterior of the primary scintillating fiber bundle 80. Both guide tube 90 and sleeve 92 are composed of a flexible material so that the tube and sleeve are free to flex with the scintillator assembly within housing 34.

The gauge embodiments described herein eliminate the need for a contact coupling between the primary scintillator and light guide in the light path, instead transmitting scintillating light through the open space within the gauge housing. Gauge 30 is capable of transmitting light through a non-contact coupling due to the creation of scintillating light of different wavelengths, and the transfer of the light from the primary scintillator to the light guide scintillating fibers through a wave shift between the primary scintillator and the light guide fibers. The scintillating light from the primary scintillator can easily pass through the air gap and impinge on the light guide, which in turn scintillates; with the scintillating light in the light guide traveling through the light guide fibers to the common light sensor. In the embodiments described herein, the dimensions of the individual scintillators, and the spacing between scintillators, are variable, and can be customized to optimize the sensitivity and linearity of the gauge.

The level sensing gauge has been described herein in conjunction with plastic scintillators, due to the longer attenuation lengths of plastic scintillators (2.5 to 4 m). However, inorganic scintillators may also be used in the described embodiments, provided the emitted scintillating light is suitable to excite the desired emissions spectra in the light guide fibers. In addition, in the embodiments described above, the primary scintillators, both crystals and fiber bundles, are sized so that no one scintillator is longer than the attenuation length of the scintillator medium. Longer length gauges are achieved by providing multiple longitudinally spaced scintillator crystals, or by increasing the thickness of the fiber bundle in the longitudinal direction.

The present invention has been described in connection with several embodiments and some of those embodiments have been elaborated in substantial detail. However, the scope of the invention is not to be limited by these embodiments which are presented as exemplary and not exclusive. The scope of the invention being claimed is set forth by the following claims.

The invention claimed is:

1. A nuclear level sensing gauge for measuring the level of product in a bin, the gauge comprising:
  a source of nuclear radiation positioned adjacent the product in the bin;
  a housing;
  a primary scintillator provided in the housing adjacent the product in the bin and opposite the source of nuclear radiation, nuclear radiation from the source passing through the bin and impinging upon the primary scintillator, causing the primary scintillator to generate scintillating light;
  light sensing circuitry for detecting light; and
  an optical fiber for conveying the scintillating light from the primary scintillator to the light sensing circuitry which internally reflects light conveyed from a first end of the fiber to a second end of the fiber, the scintillating light being transmitted from the primary scintillator into the optical fiber through an air coupling, the optical fiber emitting light in response to absorption of the scintillating light from the primary scintillator, the light sensing circuitry collecting the emitted light from the optical fiber to provide a representation of the level of radiation-absorbing product in the bin,
  wherein the housing is comprised of a flexible material, and the housing, primary scintillator, and fibers are capable of flexing with the housing in three dimensions.

2. The nuclear level sensing gauge of claim 1, wherein the optical fiber extends through an air gap in the primary scintillator.

3. The nuclear level sensing gauge of claim 2, wherein the optical fiber further comprises a plurality of scintillating fibers, the fibers emitting light in response to absorption of the scintillating light from the primary scintillator.

4. The nuclear level sensing gauge of claim 3, wherein the light sensing circuitry is a single light collection sensor.

5. The nuclear level sensing gauge of claim 4, wherein the single light collection sensor is a photomultiplier tube.

6. The nuclear level sensing gauge of claim 4, wherein the primary scintillator comprises a bundle of scintillating fibers.

7. The nuclear level sensing gauge of claim 6, wherein the thickness of the primary scintillating fiber bundle is variable, with the bundle increasing in thickness with increased distance from the light sensor.

8. The nuclear level sensing gauge of claim 7, wherein the bundle of primary scintillating fibers is attached at one end to the housing, and wherein the fibers extend longitudinally within the bundle of primary scintillating fibers.

9. The nuclear level sensing gauge of claim 4, wherein the primary scintillator comprises a plurality of scintillating crystals.

10. The nuclear level sensing gauge of claim 9, wherein the plurality of crystals are in a spaced relationship along a longitudinal length of the housing.

11. The nuclear level sensing gauge of claim 10, wherein the spacing between the plurality of crystals is variable.

12. The nuclear level sensing gauge of claim 11, wherein the spacing between crystals decreases with increased distance from the light sensing circuitry.

13. The nuclear level sensing gauge of claim 12, wherein the fibers extend longitudinally within the housing, passing through an air gap formed in each of the plurality of crystals.

14. The nuclear level sensing gauge of claim 3, wherein a first end of the fibers is connected to the light sensing circuitry and a second end of the fibers extends unattached within the housing.

15. The nuclear level sensing gauge of claim 3, wherein the primary scintillator is comprised of polyvinyl toluene and the fibers are comprised of polystyrene.

16. A nuclear level sensing gauge for measuring the level of product in a bin, comprising:
- a source of nuclear radiation positioned adjacent the product in the bin;
- a housing;
- a plurality of scintillating crystals spaced from each other in a serial fashion in the housing adjacent the product in the bin and opposite the source of nuclear radiation, each of the scintillating crystals having an opening formed therein, the nuclear radiation from the source impinging on one or more of the crystals in an amount dependent upon the product in the bin, the crystals generating scintillating light in response to the impinging radiation;
- a common light sensor for detecting light; and
- a plurality of scintillating fibers having a longitudinal length extending through openings in the crystals, the crystals being spaced along the length of the fibers, the plurality of fibers having a common end connected to the light sensor, the fibers absorbing scintillating light from each of the scintillators and emitting light in response to absorption of scintillating light from the crystals, the emitted light being conveyed through the fibers to the common light sensor, the common light sensor collecting the emitted light to provide a representation of the level of radiation-absorbing product in the bin,
- wherein the plurality of scintillating crystals and the plurality of scintillating fibers are capable of flexing with the housing in three dimensions.

17. The nuclear level sensing gauge of claim 16, wherein the plurality of scintillating fibers extend through an air gap in each of the crystals.

18. The nuclear level sensing gauge of claim 17, further comprising variable spacing between the plurality of crystals along the length of the scintillating fibers.

19. A method for measuring the level of product in a bin, comprising:
- positioning a source of nuclear radiation adjacent the product in the bin;
- positioning a primary scintillator inside a housing, the housing being adjacent to the product in the bin and opposite the source of nuclear radiation, such that nuclear radiation from the source passes through the bin and impinges upon the primary scintillator, causing the primary scintillator to generate scintillating light;
- providing an optical fiber within the housing which internally reflects light conveyed from a first end of the fiber to a second end of the fiber, the fiber being coupled to the primary scintillator through an air gap for absorbing the scintillating light from the primary scintillator and emitting light in response thereto, wherein the scintillator and the optical fiber bundle are capable of flexing with the housing in three dimensions; and
- collecting the emitted light from the optical fiber; and
- using the collected light to provide a representation of the level of radiation-absorbing product in the bin.

20. The method of claim 19, wherein the optical fiber comprises a bundle of scintillating fibers extending within an air gap relative to the primary scintillator.

21. The method of claim 20, wherein the emitted light is collected by a common light sensor.

22. The method of claim 21, wherein the common light sensor is a photomultiplier tube.

23. The method of claim 19, wherein the primary scintillator comprises a plurality of scintillating crystals.

24. A flexible nuclear level sensing gauge for measuring the level of product in a bin using a source of nuclear radiation positioned adjacent the product in the bin; the gauge comprising:
- a flexible housing attached to the bin opposite the source of nuclear radiation;
- a plurality of primary scintillators provided in the flexible housing for generating scintillating light in response to absorption of nuclear radiation from the source;
- a light sensor for detecting light and converting the light into an electrical pulse indicative of the level of product in the bin; and
- a plurality of light guide fibers extending within the housing and receiving light from one or more of the plurality of scintillators, the plurality of light guide fibers attached at a common end to the light sensor, the plurality of scintillators and light guide fibers capable of bending with the flexible housing in three dimensions.

25. The flexible nuclear level sensing gauge of claim 24, wherein the plurality of primary scintillators comprise scintillating crystals in a spaced relationship within the housing.

26. The flexible nuclear level sensing gauge of claim 24, wherein the plurality of primary scintillators comprise scintillating fibers extending longitudinally in the housing, the fibers comprising variable-sized bundles.

* * * * *